(No Model.) 5 Sheets—Sheet 3.
M. M. GARVER & E. G. WILLYOUNG.
ELECTRICAL MEASURING INSTRUMENT.
No. 514,593. Patented Feb. 13, 1894.
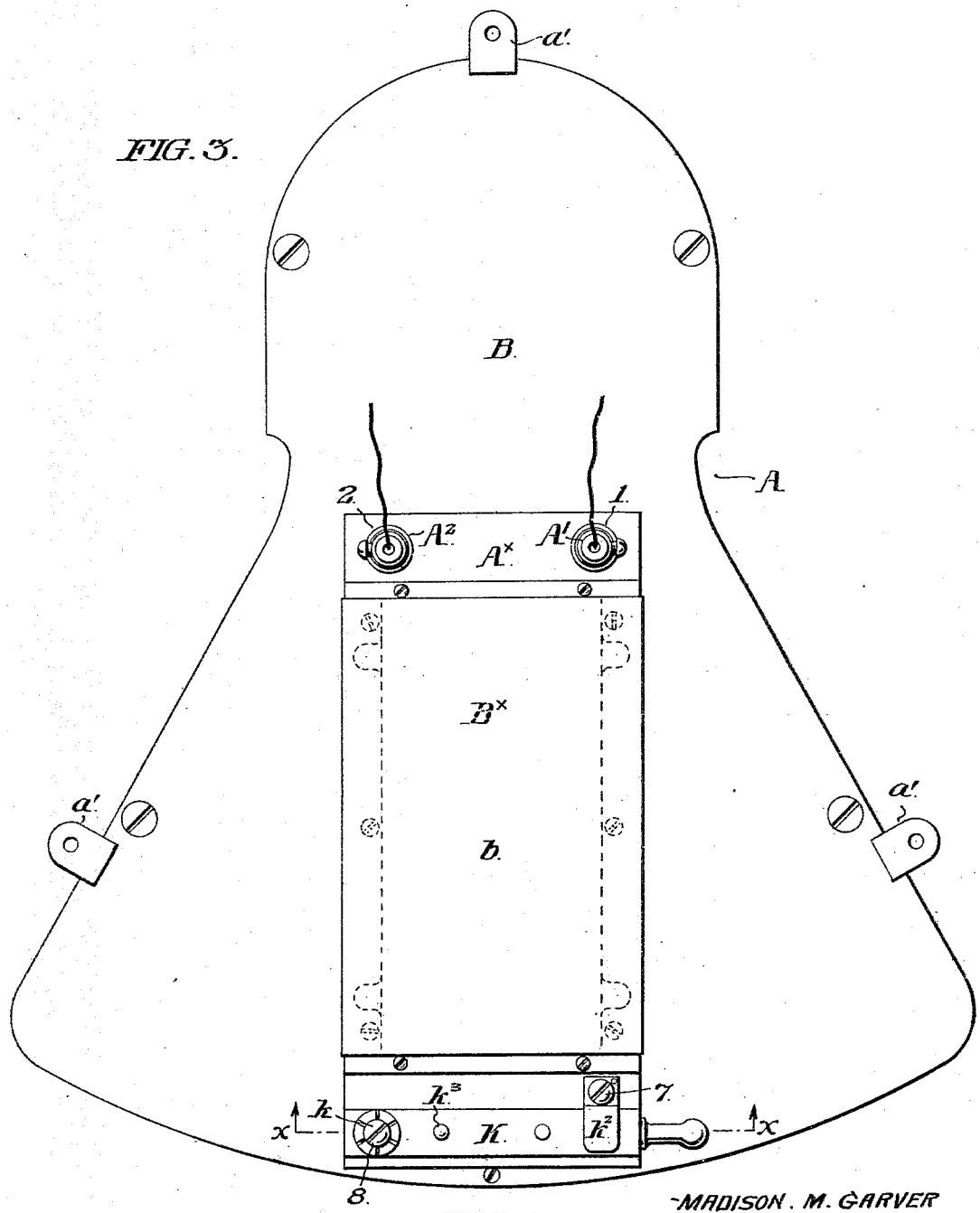
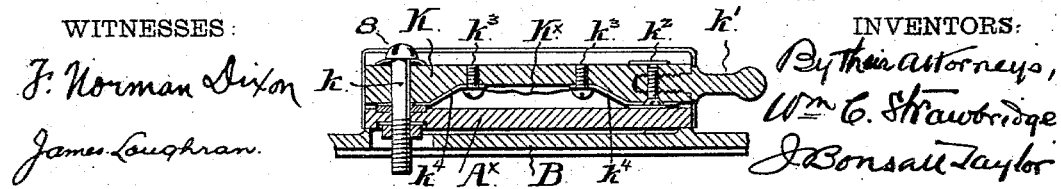
WITNESSES:
F. Norman Dixon
James Loughran
INVENTORS:
MADISON. M. GARVER
ELMER. G. WILLYOUNG
By their Attorneys,
Wm C. Strawbridge
J. Bonsall Taylor

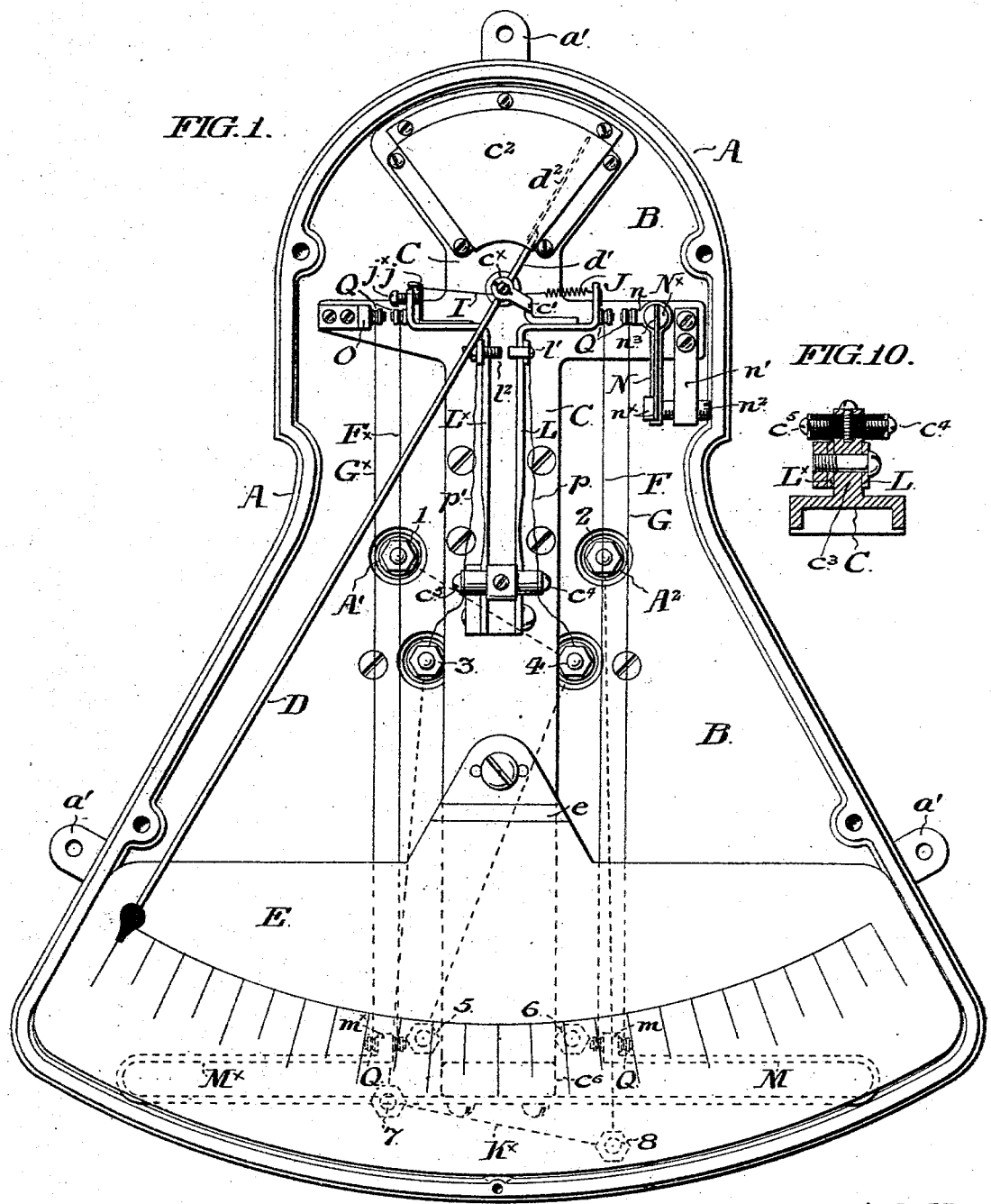

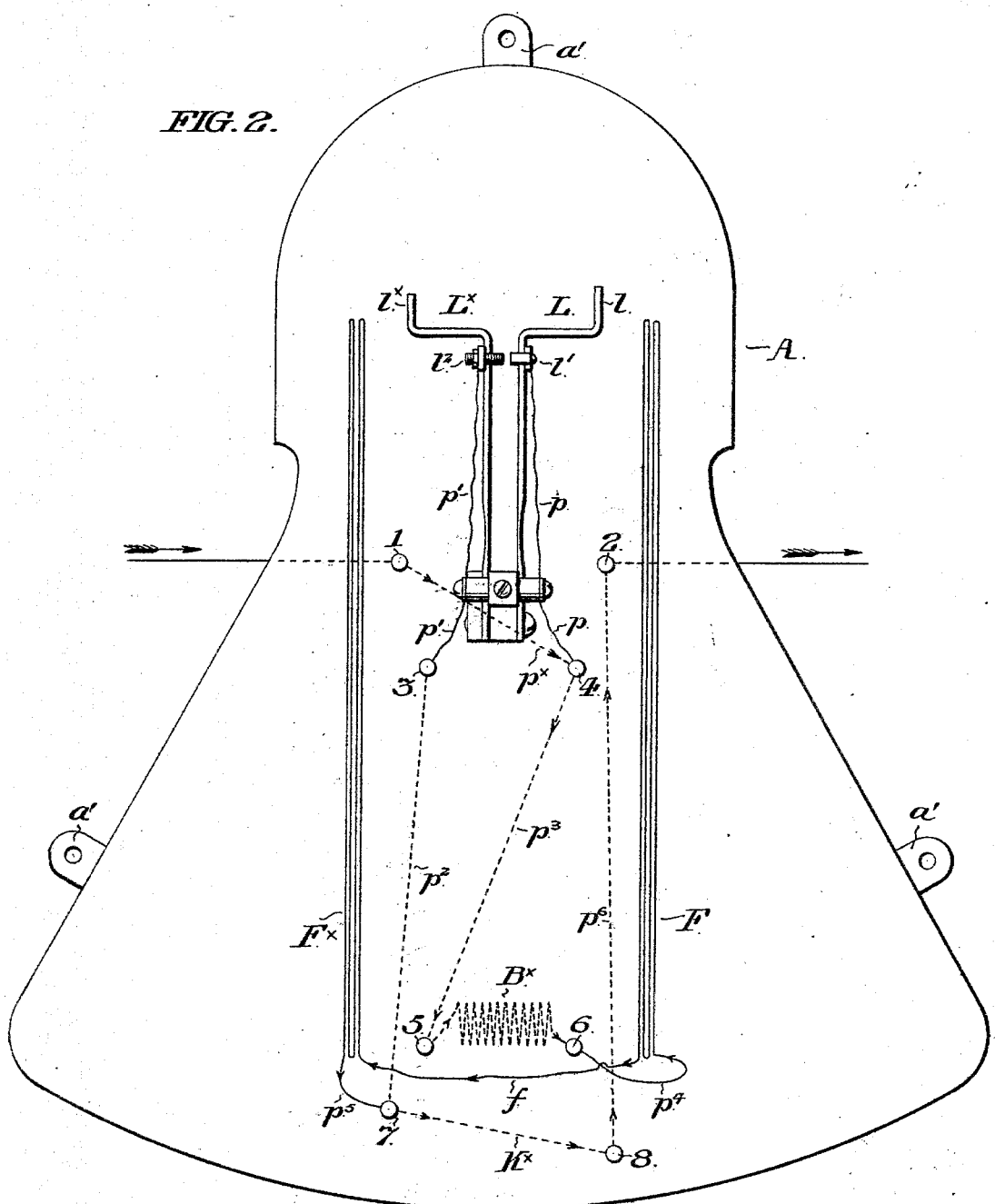

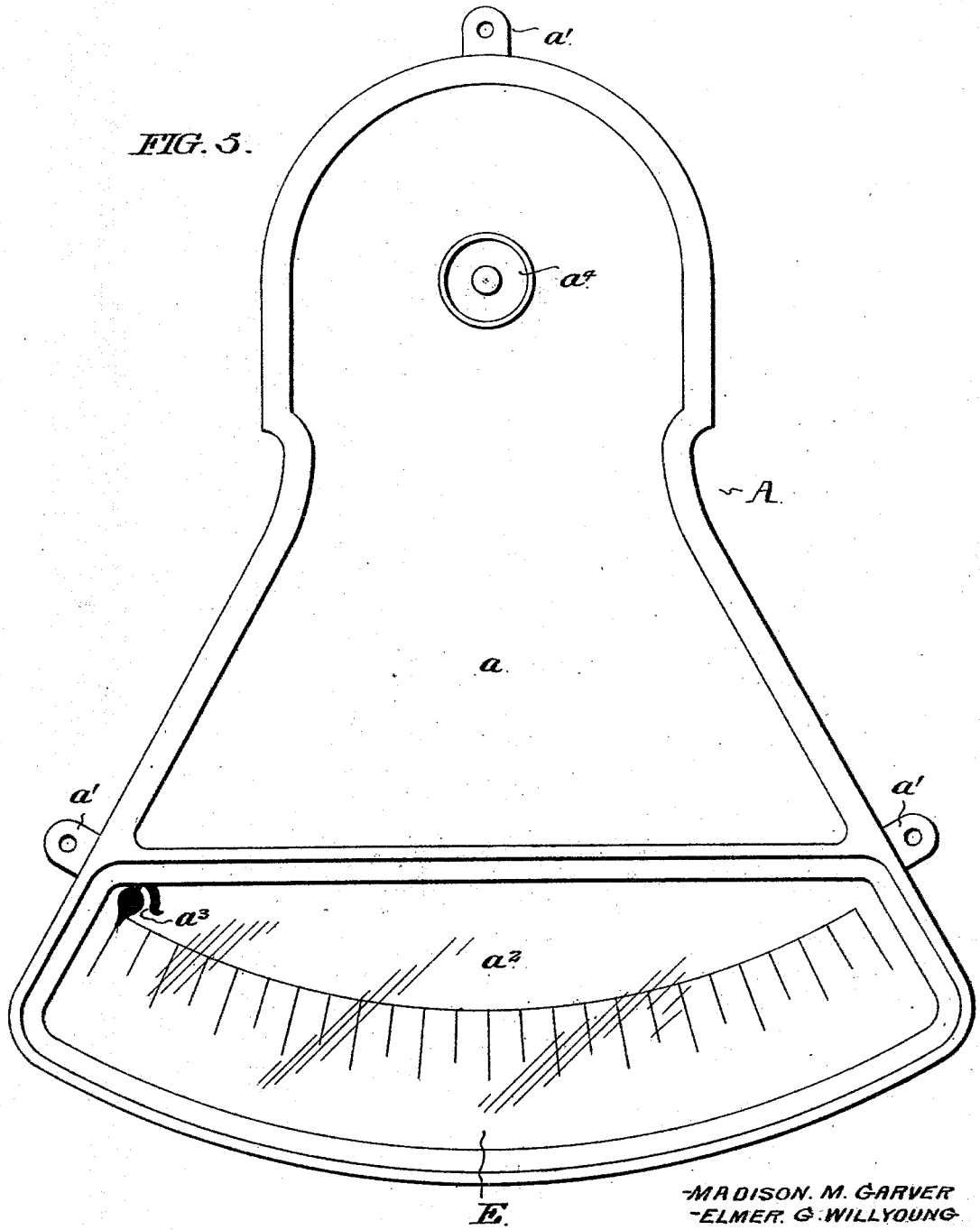

(No Model.) 5 Sheets—Sheet 5.
M. M. GARVER & E. G. WILLYOUNG.
ELECTRICAL MEASURING INSTRUMENT.
No. 514,593. Patented Feb. 13, 1894.
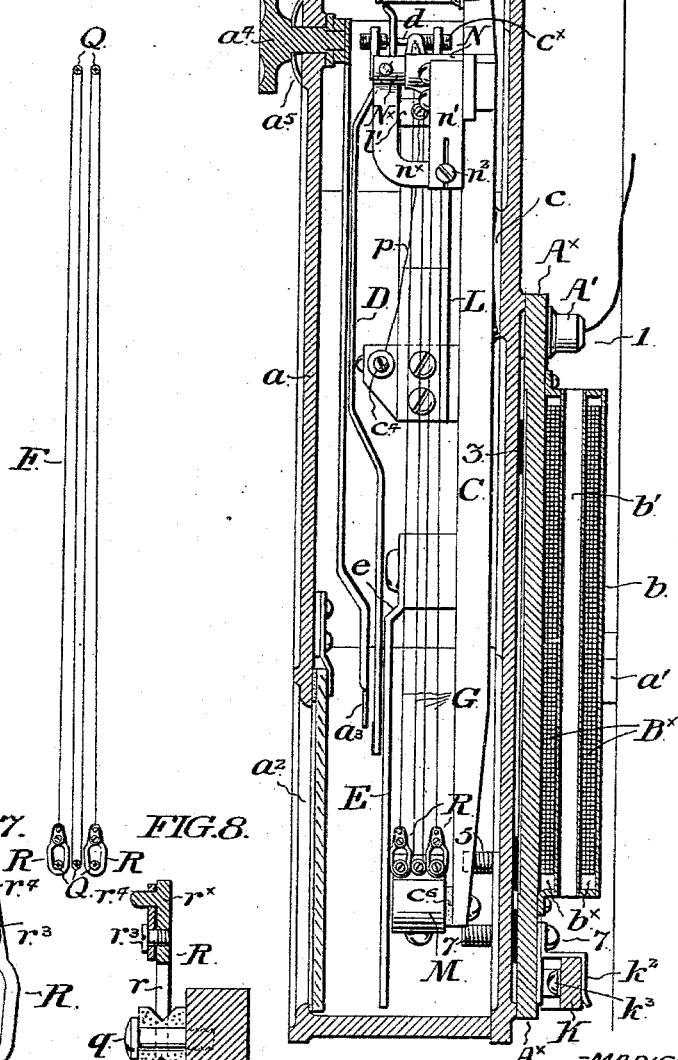
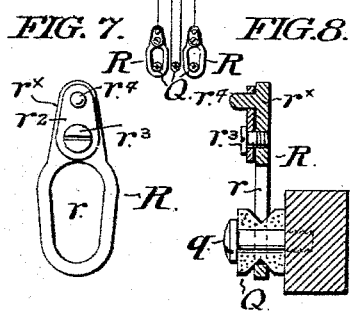
WITNESSES
F. Norman Dixon
James Loughran
MADISON. M. GARVER
ELMER. G. WILLYOUNG
INVENTORS:
By their Attorneys,
Wm C. Strawbridge
J Bonsall Taylor

UNITED STATES PATENT OFFICE.

MADISON M. GARVER AND ELMER G. WILLYOUNG, OF PHILADELPHIA, PENNSYLVANIA, ASSIGNORS TO THE QUEEN & COMPANY, INCORPORATED, OF SAME PLACE.

ELECTRICAL MEASURING-INSTRUMENT.

SPECIFICATION forming part of Letters Patent No. 514,593, dated February 13, 1894.

Application filed October 13, 1893. Serial No. 488,031. (No model.)

*To all whom it may concern:*

Be it known that we, MADISON M. GARVER and ELMER G. WILLYOUNG, citizens of the United States, residing in the city and county of Philadelphia, in the State of Pennsylvania, have invented certain new and useful Improvements in Electrical Measuring-Instruments, of which the following is a specification.

Our invention relates to that class of electric meters for measuring the voltage of direct or alternating currents of electricity, which makes use of the heating effect of the current upon a wire conductor through which it is caused to pass, to occasion the linear expansion of said conductor, the extent of which expansion is indicated upon a scale by a pointer to which the movement of the conductor is suitably transferred. The leading instrument of this class is known as the "Cardew volt-meter," the fundamental type of which is described and shown in United States Letters Patent No. 342,777, granted June 1, 1886, to Philip Cardew.

Our present invention embodies features of construction embodied in an instrument of the foregoing class, patented to the said Elmer G. Willyoung in and by United States Letters Patent No. 491,457, bearing date of February 7, 1893, but being a portable instrument not designed for permanent use in "stations," as is the instrument in which our present invention resides.

Our present invention, however, embodies certain of the elements of the Willyoung patented instrument:—Thus, for instance, it employs a pivoted needle or pointer, made "dead beat" by a dash-pot, and connected by a transverse connection with a stretched wire conductor through which the current is caused to pass, which is itself supported in connection with a compensating support which possesses the same coefficient of expansion, and a given expansion of which conductor is to be measured. Thus, again, the dash-pot contrivance applied to the rear end of the pointer,—the bearings which support the axial pin or pivot of the pointer, and the various brackets, housings, and spring adjusting and tension devices with which the stretched conductor and the compensating wire are connected and supported,—are all erected from a carrying frame which is supported from the case at a place of small area, to obviate any relative change of position of the several parts of the instrument which might arise from the extension, contraction, warping, or splitting of the material of the case.

Our present invention, moreover, embodies certain improvements upon instruments of this class which form the subject-matter of an application for patent executed by us and filed contemporaneously with this application as Serial No. 488,049—and which in part deals with the transverse connection between the "working" wires, as the stretched conductors are called, and the pointer,—and also in part deals with compensating supports for the working wires, composed of one or a plurality of wires substantially identical with the working wires, that is to say possessing the same substance, and, hence, the same coefficient of expansion, and the same or nearly the same length as the working wires.

Except where mention of it is proper in the hereinafter contained description of the parts which are common to both instruments, no further reference to our pending application is required.

Our present invention is adapted for use as a station instrument, which will necessarily be subjected to hard usage, continual vibration, and shock, and will usually be in circuit, and its moving parts must, therefore, be strong and stiff, and its operating forces correspondingly powerful. In other words, the working or "hot" wires, and the compensating wires, employed, must possess sufficient tensile strength to permit of their being under strong tension, whereby the relative errors of an unavoidable friction will be lessened and sufficient force be provided to actuate the working system which controls the deflection of the pointer, without risk of straining the wires beyond their elastic limit. These conditions are satisfied by such a device as is represented in the accompanying drawings and hereinafter described, and in which the working wire is strung back and forth, so as to constitute in effect a plurality of wires placed mechanically in parallel, but electrically in series, and in which the compensating wires are similarly strung. The general aim of our invention being the manufacture of a station volt-meter which shall be strong, simple, compact, accurate, and not liable to get out of order, we resort to the construction hereinafter described.

In the drawings, Figure 1 is a front elevational view of an instrument embodying our invention, with the face-plate removed to exhibit the working parts. Fig. 2 is a diagrammatic view illustrative of the circuits of the instrument. Fig. 3 is a rear or back view of the instrument as shown in Fig. 1. Fig. 4 is a transverse sectional elevation through the fuse and fuse-carrying devices, in the plane of the dotted line $x-x$ of Fig. 3. Fig. 5 is a front elevational view of the instrument with its face plate in position. Fig. 6 is a right hand side elevational view of the instrument as shown in Figs. 1 and 5, certain of the parts being in section the better to exhibit the construction. Fig. 7 is a side elevation of one of the pulley eyes for securing the ends of the wires. Fig. 8 is an edge elevational view of the same as applied to a stringing pin or pulley shown in section. Fig. 9 is a side elevational view of a "set," so to speak, of either the working or the compensating wires. Fig. 10, is a transverse, sectional elevational detail of the devices for securing the angled spring bars.

Similar letters and numerals of reference indicate corresponding parts.

In the drawings, A is the case, well made when of the form represented, and adapted to be supported in the vertical position represented in Fig. 1, by being secured against a wall conveniently through the medium of screw plates $a'$. The case is adapted to be inclosed by a face plate $a$, the lower portion of which is provided with a glass-covered opening $a^2$, through which the scale and the tip of the pointer may be viewed. An index or indicator $a^3$, placed beneath the face plate and above the pointer, carries a crescent-shaped tip at its lower end, and at its upper end is pivoted in axial alignment with the axial pin of the pointer or needle, conveniently by means of a thumb button $a^4$, passing through the face plate and frictionally maintained against other than intentional rotation by a spring $a^5$ acting beneath its head. The indicator is a device of convenience, which, being set to correspond with a given reading of the pointer, renders easy the observance of subsequent deflections of said pointer. The case is inclosed by a bottom B to which are applied the positive binding post A' and the negative binding post $A^2$ which constitute the main terminals of the instrument. To prevent tampering with the instrument, the case may be put together and sealed in a manner similar to that set forth in our pending application referred to. To the rear face of the case is applied an extra resistance coil $B^x$, disposed within a chamber $b^x$ conveniently formed of metal plates $b$, and embodying within it a flat metal flue $b'$ coextensive in length with it and opening through its bottom and top. The outer surface of this flue serves as a core, so to speak, around which the extra resistance may be wound. The heat developed in this extra resistance escapes not only by radiation through the walls of the chamber but also by connection through the flue. The binding posts and the chamber for the extra resistance are both applied to the rear face of an insulating base $A^x$ applied to the bottom of the case, as will be understood from a reference to Figs. 3 and 6. Immediately below the extra resistance and upon this base is applied a fuse-carrying cut-out device of the following construction:

K is a switch lever, formed of insulating material and pivoted at one extremity upon a fulcrum pin $k$, and at the other extremity conveniently provided with a handle $k'$ by which it may be swung downwardly about its pivot and from out the jaws of a spring contact plate $k^2$.

$K^x$ is the fuse, removably applied by means of fuse-retaining screws $k^3$, which screw into the insulating substance of the body of said lever and place the fuse in circuit with the main circuit of the instrument, whereof hereinafter, through contact plates $k^4$ upon the lever, and through the fulcrum pin $k'$ on the one hand and the spring contact $k^2$ on the other, when the lever is swung into the position represented in Figs. 3 and 4. When the lever is swung down, the circuit is broken, and the fuse may be replaced without risk of sparking,—it being impossible to insert a fuse when the circuit of the instrument is completed with a lever in its normal or upper position.

Within the case is a metal frame, which we term the carrying plate C, and which is well made when of the form represented in Figs. 1 and 6. This plate is erected and supported in a vertical position from the bottom B of the box at a place of small area, the rear face of the plate being, to such end, conveniently provided with a rearwardly extending boss $c$, Fig. 6. This plate carries and supports the working parts of the instrument and embodies the features of invention set forth in the Willyoung patent referred to.

D is a needle or pointer adapted for oscillatory movement by being conected with an axial pin $d$, the tapering pivot points of which are adapted to jeweled bearings $c^x$ in a needle housing or yoke $c'$ springing from and carried by one of a pair of oppositely acting spring bars L, whereof hereinafter. The rear extension $d'$ of the pointer carries a vane $d^2$, adapted to a segmentally formed vane chamber $c^2$ erected from the carrying plate, to render the pointer "dead beat."

E is a scale plate, the form of which is clearly shown in the drawings, and which is supported by a bracket $e$ springing from the carrying plate.

The carrying plate and its supported appliances, so far as already described, are elements of the instrument of the Willyoung patented device. The devices hereinafter described as applied to the carrying plate, are special to our present invention and confer upon the instrument many of its peculiar advantages. These devices, generally referred to, consist of a pair of opposing angled spring bars $L\ L^x$, at the upper portion of the carrying frame, one of which, as mentioned, carries the housing of the pointer, and with reference to both of which the two "sets" of working wires employed are, as to their upper portions, so to speak, supported,—a pair of spring supports $M\ M^x$ at the base of the carrying frame, with reference to which the lower portions of both "sets" of working wires and also both "sets" of compensating wires, are connected,—an adjusting lever N at the upper portion of the frame, with reference to which the upper portions of one "set" of compensating wires are connected,—and a fixed support O, correspondingly and oppositely disposed relatively to the adjusting lever, at the upper portion of the carrying frame, with reference to which the upper portions of the opposite "set" of compensating wires are connected.

We can, in many ways, construct and apply the foregoing elements, with relation to which the working and compensating wires employed are disposed and maintained. We prefer, however, to form and apply them in the following manner:

L is the right-hand angled spring bar, and $L^x$ the left-hand angled spring bar, of the pair referred to. These spring bars are flat bars of brass or other springy metal, bent or angled at their upper portions, in the manner shown in Fig. 1. They are opposite counterparts, so to speak, of each other, and the strips of metal of which they are composed are many times wider than thick, so that the bars, which stand at right angles to the face of the carrying plate are broad enough to afford bearings, or heads $l\ l^x$, for the attachment of the pointer housing, the stringing pins, and the yielding spring, hereinafter referred to. At their lower portions these spring bars are permanently secured to the opposite sides of a vertical lug or stud $c^3$, springing from the carrying plate. This lug is conveniently provided with binding posts $c^4\ c^5$, to which are adapted to be applied as shown the conductors $p\ p'$ which form part of the shunt circuit hereinafter referred to. At their upper extremities these spring bars are provided with circuit closing contacts, one of which $l'$ is fixed, and the other $l^2$ is adjustable. When the two members of this circuit closing device are in contact, as they are under such relaxation of the working wires as is due to the passage of a dangerously high current, a short circuit is established through the conductor $p^x$, the conductor $p$, the circuit closing contacts $l'\ l^2$, the conductor $p'$, and the supplemental conductor $p^2$, and the current shunted through the fuse, as will be understood from a reference to the diagram of Fig. 2.

The deflection of the pointer from its zero position is, in the operation of the instrument, occasioned through the medium of a transverse connection between the upper portions or heads of the spring bars, which, in its course, is engaged with the axial pin of the pointer,—when the upper extremities of said bars converge under such relaxation of the working wires in the passage of the current through the circuit of the instrument, as permits said bars to reassume that natural set or position of propinquity to each other from which they are held apart or back by the tension of the working wires when the current is passing.

The transverse connection referred to, by which the spring bars are, in their convergence and divergence, caused to operate the pointer, may be either such a connection of links as is represented in the Willyoung patent hereinbefore referred to, or, preferably, such a continuous filament connection as forms part of the invention of our pending application for patent referred to.

For the purposes of this application it is sufficient to simply say that I is a connecting filament, being preferably rolled of phosphor bronze, very light and flat, and extending and connecting from the upper portion of the spring bar $L^x$ across to the take-up spring J which is connected with the upper portion of the spring bar L, and that, in its course, said filament is so engaged with the axial pin of the pointer as to occasion the rotary movement of said pin in the mutual approach or recession of the spring bars under the compensating influence of said take-up spring.

Although in the operation of our other instrument referred to, the take-up spring affords sufficient relief when the working wires contract, yet in an instrument in which the forces involved are as great as in the present one, when the current is suddenly "turned off" and the working wires as suddenly contract and pull the spring bars apart, the spring bar $L^x$ is apt to cause such a jerk upon the filament on the side opposite to the take up spring, or to the left of the axial pin of the pointer as to stretch the filament and change its bend, thus altering the zero. To overcome this possibility of injury, we connect the left hand end of the filament to a supplemental spring, which we term the safety spring $j$, and which is a flat spring secured to the head $l^x$ of the spring $L^x$, and provided with an adjusting screw $j^x$ by which its set may be exactly regulated. Although when the pointer is at zero or at any position in the passage of a steady current, the stress of this safety spring is such as to cause it to remain seated against its adjusting screw, yet when the sudden jerk ensues upon the "turning off" of the current, the safety spring yields and the filament remains uninjured.

Referring now to the working and the compensating wires themselves,—we employ a set of compensating wires and also a set of working wires upon each side of the longitudinal axis of the instrument. We say a "set" on each side, but, as a matter of fact, each so-called "set" of working wires and "set" of compensating wires, is composed of a single wire strung, under appropriate tension, back and forth over suitable attaching or stringing devices, preferably fixed grooved ivory pulleys. By this system of application, we place each length of wire of each so-called "set" mechanically in parallel but electrically in series with every other length existing in and forming part of said set. In the drawings, we have illustrated each set as composed of four lengths or turns of wire, and the two sets of compensating wires are composed each of a wire of the same substance and length and of the same or nearly the same cross section and consequently co-efficient of linear expansion, as is each wire which composes each set of the corresponding parallel sets of working wires. In operation the current, of course, passes only through the working wires. The mechanical function of the sets of compensating wires, is to maintain a permanent relation between the index and the scale, which shall be independent of the temperature of the surrounding air or of the supporting frame.

The application of compensating wires possessing the same diameter, substance, length, and coefficient of expansion, and employed in connection with a working wire as a compensating support therefor, forms part of the subject-matter of our application for patent hereinbefore referred to, and is not broadly claimed herein.

M M$^\times$ are, as stated, a pair of spring supports, M being that upon the right, and M$^\times$ being that upon the left. These supports are preferably formed of a single and continuous strip of brass or other springy metal bent to the form shown in dotted lines in Fig. 1, and secured by being screwed to a carrying block $c^6$ erected from the lower portion of the carrying frame. Each of these spring supports is conveniently of a U-form and horizontally and oppositely disposed. The free inner end of each support is formed or provided with a vertical heel $m$ $m^\times$, the same being blocks, plates, or webs, of metal, to both outside faces of each of which the ivory wire-attaching pulleys or stringing pins are applied.

O is a fixed support, erected, as stated, from the upper portion of the carrying plate, preferably in line above the heel $m^\times$ of the spring support M$^\times$. This support is conveniently a vertical plate or web rigidly affixed to or forming part of the carrying frame, and itself carrying ivory pulleys for the upper bends of the left hand set of compensating wires.

N is an adjusting lever, being a bell crank the fulcrum of which is a pin N$^\times$ springing horizontally from the upper portion of the carrying plate,—the upper crank arm of which, which we have designated $n$, extends transversely and horizontally inward in approximately opposite disposition to the fixed support O, and is provided with ivory pulleys for the upper bends of the right hand set of compensating wires,—while the lower arm of said lever, to which the letter N is directly applied, extends vertically downward alongside of a fixed depending lug $n'$ springing from the carrying frame, and at its lower extremity provided with a lever-adjusting screw $n^2$ against which the lower extremity of the depending arm of the lever is laterally held by a lever spring $n^\times$ conveniently formed of brass or other suitable material in the bent form represented in Fig. 6, and conveniently supported by having its upper end secured in a slot $n^3$ formed in the fulcrum pin N$^\times$ as shown in Figs. 1 and 6. The normal set of this lever spring is such as to maintain the lever in contact with its adjusting screw,—and, obviously, by the adjustment of said screw the set of the upper crank arm of the lever and its ivory pulleys may be accurately determined, with the result of securing the most exact possible adjustment of the wires of the right hand set of compensating wires.

All of the ivory pulleys are, for simplicity of designation, indicated by the letter Q, and each is secured by a pulley screw $q$, as particularly illustrated in Fig. 8.

In the instrument illustrated, each set of working wires and each set of compensating wires is composed of four lengths of the same continuous wire. For the purpose of securing the upper portions of the sets, two pulleys are supplied to the fixed support O, to the adjusting lever N, and to the heads $l$ $l^\times$ of the spring bars L L$^\times$. In order to secure the two free extremities of each of these wires as strung back and forth over its particular pulleys to constitute a particular set of either the working or the compensating wires, we find it convenient to provide a metal loop-piece which we term a pulley-eye R, which is formed, as shown in Figs. 7 and 8, with a tapering loop $r$ or eye proper, and with a shank $r^\times$ against which a clamp plate $r^2$ is adapted to be secured by a clamp screw $r^3$ in conjunction with a fixed stud $r^4$ which springs laterally from the shank $r^\times$ and passes through an aperture $r^5$ in the clamp plate. As will be apparent, the extremital portion of a wire may be secured to the pulley Q by being clamped between its shank and the clamp plate.

In the application of the eye-provided compensating and working wires represented in the drawings, three ivory pulleys are applied to each side face of each heel of the spring supports M M$^\times$, and the pulley eyes take over the inner and outer pulleys of each series as shown in Fig. 9, and when in place, by virtue of the tapering form of their loops, maintain themselves against accidental displacement from the pulleys. These pulley-eyes permit of a nice adjustment in the length of each wire as applied, and the idea of stringing each wire back and forth with reference to fixed grooved pulleys or kindred stringing pins, eliminates friction at the pulleys or pins, because as the same current is flowing through the whole of each working wire, each length of the strung wire expands to precisely the same extent as every other length and the wire at the pin therefore remains stationary.

The right hand set of working wires is designated by the letter F, and the left hand set $F^x$, the cross connection from one set to the other being conveniently by the wire $f$, which of course, is identical in character with the wires F $F^x$. The right hand set of compensating wires is designated G, and the left hand set $G^x$.

Having now explained in what manner the working and compensating wires are applied, it remains to describe the conductors which constitute the circuit of the instrument, and this may best be done by a reference to Fig. 2.

The current enters at the positive binding post A', which upon the diagram is designated 1, and passes through the conductor $p^x$ to the binding post 4;—thence through the conductor $p^3$, to the binding post 5;—thence through the extra resistance, to the binding post 6;—thence through the conductor $p^4$ to the right hand set F of the working wires;—thence through the wire connection $f$, to the left hand set $F^x$ of working wires;—thence through the conductor $p^5$, to the post 7;—thence through the fuse, to the post 8;—thence through the conductor $p^6$, to the negative terminal $A^2$; and thence out of the instrument.

The foregoing is the normal circuit of the instrument. As heretofore explained, under certain circumstances, a shunt circuit from the positive terminal, through the conductor $p^x$, post 4, conductor $p$, circuit closer $l'$ $l^2$, conductor $p'$, post 3, supplemental conductor $p^3$, post 7, fuse, post 8, and conductor $p^6$, is established.

Having thus described our invention, it is proper to add that minor details which involve simply the mechanical construction of the instrument, may be altered or modified at will without departure from the spirit of our invention.

Having thus described our invention, we claim—

1. In a measuring instrument for measuring electrical currents, in combination:—a carrying plate,—a set of working wires through which a current is caused to pass,—a pointer connected with said set,—a corresponding opposite set of substantially identical working wires likewise connected with said pointer, over which also said current is caused to pass,—a set of compensating wires substantially identical with the working wires and disposed in connection with the first set of said working wires,—a corresponding opposite set of substantially identical compensating wires disposed in connection with the second set of working wires,—and means connected with the carrying plate for maintaining all of said wires under tension,—substantially as described.

2. In a measuring instrument for measuring electrical currents, in combination:—a carrying plate,—a set of working wires through which a current is caused to pass,—a pointer connected with said set,—a corresponding opposite set of substantially identical working wires likewise connected with said pointer, over which also said current is caused to pass,—a set of compensating wires substantially identical with the working wires and disposed in connection with the first set of said working wires,—a corresponding opposite set of substantially identical compensating wires disposed in connection with the second set of working wires,—and spring tensional devices for maintaining all of the sets of wires under spring tension,—substantially as described.

3. In a measuring instrument for measuring electrical currents, in combination:—a carrying plate,—a set of working wires through which a current is caused to pass,—a pointer connected with said set,—a corresponding opposite set of substantially identical working wires likewise connected with said pointer, over which also said current is caused to pass,—a set of compensating wires substantially identical with the working wires and disposed in connection with the first set of said working wires,—a corresponding opposite set of substantially identical compensating wires disposed in connection with the second set of working wires,—spring tensional devices for maintaining all of the sets of wires under spring tension,—and means for adjusting the tension upon one of the sets of compensating wires,—substantially as described.

4. In a measuring instrument for measuring electrical currents, in combination:—a carrying plate,—a set of working wires over which a current is caused to pass,—a pointer connected with said set,—and consisting of a single wire strung back and forth in given lengths which are electrically in series and mechanically in parallel,—a corresponding opposite and similarly strung set of substantially identical working wires likewise connected with said pointer, over which also said current is caused to pass,—a similarly strung set of compensating wires substantially identical with the working wires and disposed in connection with the first set of said working wires,—a corresponding opposite and similarly strung set of substantially identical compensating wires disposed in connection with the second set of working wires,—and means connected with the carrying plate for maintaining all of said sets of wires under tension,—substantially as described.

5. In a measuring instrument for measuring electrical currents, in combination:—a carrying plate,—a set of working wires connected with a pointer, over which a current is caused to pass, and consisting of a single wire strung back and forth in given lengths which are electrically in series and mechanically in parallel,—a corresponding opposite and similarly strung set of substantially identical working wires likewise connected with said pointer, over which also said current is caused to pass,—a similarly strung set of compensating wires substantially identical with the working wires and disposed in connection with the first set of said working wires,—a corresponding opposite and similarly strung set of substantially identical compensating wires disposed in connection with the second set of working wires,—and spring tensional devices for maintaining all of the sets of wires under spring tension,—substantially as described.

6. In a measuring instrument for measuring electrical currents, in combination:—a carrying plate,—a set of working wires connected with a pointer, over which a current is caused to pass, and consisting of a single wire strung back and forth in given lengths which are electrically in series and mechanically in parallel,—a corresponding opposite and similarly strung set of substantially identical working wires likewise connected with said pointer, over which also said current is caused to pass,—a similarly strung set of compensating wires substantially identical with the working wires and disposed in connection with the first set of said working wires,—a corresponding opposite and similarly strung set of substantially identical compensating wires disposed in connection with the second set of working wires,—and means for adjusting the tension upon one of the sets of compensating wires—substantially as set forth.

7. In a measuring instrument for measuring electrical currents, in combination:—a carrying plate,—a set of working wires connected with a pointer, over which a current is caused to pass,—a corresponding opposite set of substantially identical working wires likewise connected with said pointer, over which also said current is caused to pass,—a set of compensating wires substantially identical with the working wires and disposed in connection with the first set of said working wires,—a corresponding opposite set of substantially identical compensating wires disposed in connection with the second set of working wires, a pair of spring supports to which the wires of all the sets are at their outer ends connected,—a pair of oppositely acting spring bars to which the wires of the two sets of working wires are, at their other ends connected,—and supports to which the wires of the two sets of compensating wires are at their other ends connected, substantially as described.

8. In a measuring instrument for measuring electrical currents, in combination:—a carrying plate,—a set of working wires connected with a pointer, over which a current is caused to pass,—a corresponding opposite set of substantially identical working wires likewise connected with said pointer, over which also said current is caused to pass,—a set of compensating wires substantially identical with the working wires and disposed in connection with the first set of said working wires,—a corresponding opposite set of substantially identical compensating wires disposed in connection with the second set of working wires,—a pair of spring supports to which the wires of all the sets are, at their outer ends, connected,—a pair of oppositely acting spring bars to which the wires of the two sets of working wires are, at their other ends connected,—a fixed support to which the wires of one set of compensating wires are, at their other ends connected,—and an adjustable support to which the wires of the other set of compensating wires are at their ends connected,—substantially as described.

9. In a measuring instrument for measuring electrical currents:—in combination with conductors forming part of the circuit of the instrument,—a set of working wires composed of a single continuous resistance wire strung back and forth over fixed stringing pins maintained at an appropriate distance apart, each of the lengths of said wire so strung being in series with the other lengths, and the set itself in series with the conductors, whereby upon the establishment of the current the lengths of the said wire expand equally without creeping upon their pins,—substantially as described.

10. In a measuring instrument for measuring electrical currents, in combination:—a carrying plate,—an axial pin supported in bearings from said plate, and provided with a pointer,—a pair of oppositely-acting spring bars supported from the plate, and at their free ends connected with the respective end portions of a filament or kindred transverse connection intermediately of its length connected with the axial pin,—a set of working wires connected with one spring bar,—a set of working wires connected with the other spring bar and in series with the first set,—a set of compensating wires in association with the first set of working wires,—a set of compensating wires in connection with the second set of working wires,—and suitable means for maintaining all of the sets of wires under tension,—the arrangement being such that when the current is caused to pass through the sets of working wires in series in the circuit of the instrument, the relaxation of said wires permits the spring bars to mutually approach, and through their transverse connection to occasion the operation of the pointer,—substantially as described.

11. In a measuring instrument for measuring electrical currents, in combination:—a carrying plate,—a pair of oppositely acting angled spring bars carried by said plate,—a bearing for the axial pin of a pointer located between the free ends of the spring bars and carried by one of them,—a filament, or transverse connection, connected with said axial pin intermediately of its length, with one spring bar by a take-up spring, and with the other spring bar by a safety spring,—and sets of working wires connected with said spring bars in the circuit of the instrument,—the arrangement being such that upon the contraction of the working wires when the current is turned off, the safety spring yields sufficiently to prevent rupture of the transverse filament,—substantially as described.

12. In a measuring instrument for measuring electrical currents,—as a device for adjusting the tension of a set of compensating wires,—the adjusting crank lever N, an arm of which is provided with stringing pins for the wires of the set,—a spring for maintaining the other arm in contact with an adjusting screw,—and a bearing for said adjusting screw, substantially as described.

13. In a measuring instrument for measuring electrical currents,—as a device for securing the end of a wire to a grooved pulley or stringing pin,—a pulley eye R formed with a tapering loop $r$ and provided with a clamp-plate $r^2$,—and means for clamping said plate upon the end of the wire,—substantially as described.

14. In a measuring instrument for measuring electrical currents,—in combination with the case of an electric measuring instrument for measuring electrical currents,—a chamber for an extra resistance, mounted upon the exterior of the case, composed of metal plates, and formed with a central flue which serves as a core for the resistance coil and as a means for carrying off its heat,—substantially as described.

15. In a measuring instrument for measuring electrical currents, in combination:—a case,—conductors forming the circuit of the instrument,—meter mechanism proper with which said conductors are in circuit,—a pivoted fuse-carrying lever formed of insulating material, equipped with conductors in the circuit of the instrument, and adapted to be swung about its pivot from its normal position in circuit, so as to break the circuit and expose the fuse,—substantially as described.

16. In a measuring instrument for measuring electrical currents, in combination with the angled spring bars L L$^\times$,—the circuit closing devices $l'\ l^2$,—and the conductors $p^\times$, $p$, $p'$, and $p^2$, which, when the circuit is closed through the closing of the contacts $l'\ l^2$, form a shunt circuit,—substantially as described.

17. In a measuring instrument for measuring electrical currents,—as a device for supporting the angled spring bars L L$^\times$, the lug $c^3$, springing from the carrying plate C, and provided with binding posts $c^4\ c^5$,—substantially as described.

In testimony that we claim the foregoing as our invention we have hereunto signed our names this 9th day of September, A. D. 1893.

MADISON M. GARVER.
ELMER G. WILLYOUNG.

In presence of—
J. BONSALL TAYLOR,
F. NORMAN DIXON.

It is hereby certified that in Letters Patent No. 514,593, granted February 13, 1894, upon the application of Madison M. Garver and Elmer G. Willyoung, of Philadelphia, Pennsylvania, for an improvement in "Electrical Measuring-Instruments," an error appears in the printed specification requiring the following correction, viz: On page 2, line 80, the word "connection" should read *convection;* and that the said Letters Patent should be read with this correction therein that the same may conform to the record of the case in the Patent Office.

Signed, countersigned, and sealed this 13th day of March, A. D. 1894.

[SEAL.]

JNO. M. REYNOLDS,
*Assistant Secretary of the Interior.*

Countersigned:

JOHN S. SEYMOUR,
*Commissioner of Patents.*